United States Patent [19]

Mori et al.

[11] 4,166,624
[45] Sep. 4, 1979

[54] RECORD PLAYER

[75] Inventors: Yoshihisa Mori; Shingo Tamura, both of Tokyo; Susumu Hoshimi; Shiro Yasuda, both of Yokohama, all of Japan

[73] Assignee: Sony Corporation, Tokyo, Japan

[21] Appl. No.: 908,740

[22] Filed: May 23, 1978

[51] Int. Cl.² .................... G11B 3/02; G11B 25/04
[52] U.S. Cl. .................... 274/9 C; 274/1 A; 46/232; 46/111
[58] Field of Search ............ 274/1 R, 1 A, 9 C, 9 R, 274/13 A, 13 R; 46/45, 232, 111, 112, 117, 118

[56] References Cited
U.S. PATENT DOCUMENTS

| 2,005,588 | 6/1935 | Mallina | 274/13 A |
| 2,236,431 | 3/1941 | Hollingsworth et al. | 274/1 R |
| 3,482,841 | 12/1969 | Doring | 274/9 C |

FOREIGN PATENT DOCUMENTS 1145550  3/1969  United Kingdom .

*Primary Examiner*—Harry N. Haroian
*Attorney, Agent, or Firm*—Lewis H. Eslinger; Alvin Sinderbrand

[57]  ABSTRACT

A gramophone record player comprises a movable body to be placed on a stationary gramophone or phonograph record, a drive in the movable body to drive the movable body on the record, a sound pick-up arranged to be energized by the sound groove of the record and mechanically connected to the movable body, and a gramophone record sound groove following guidance member coupled to the movable body in such a manner that the pick-up traces along the sound groove of the record.

8 Claims, 7 Drawing Figures

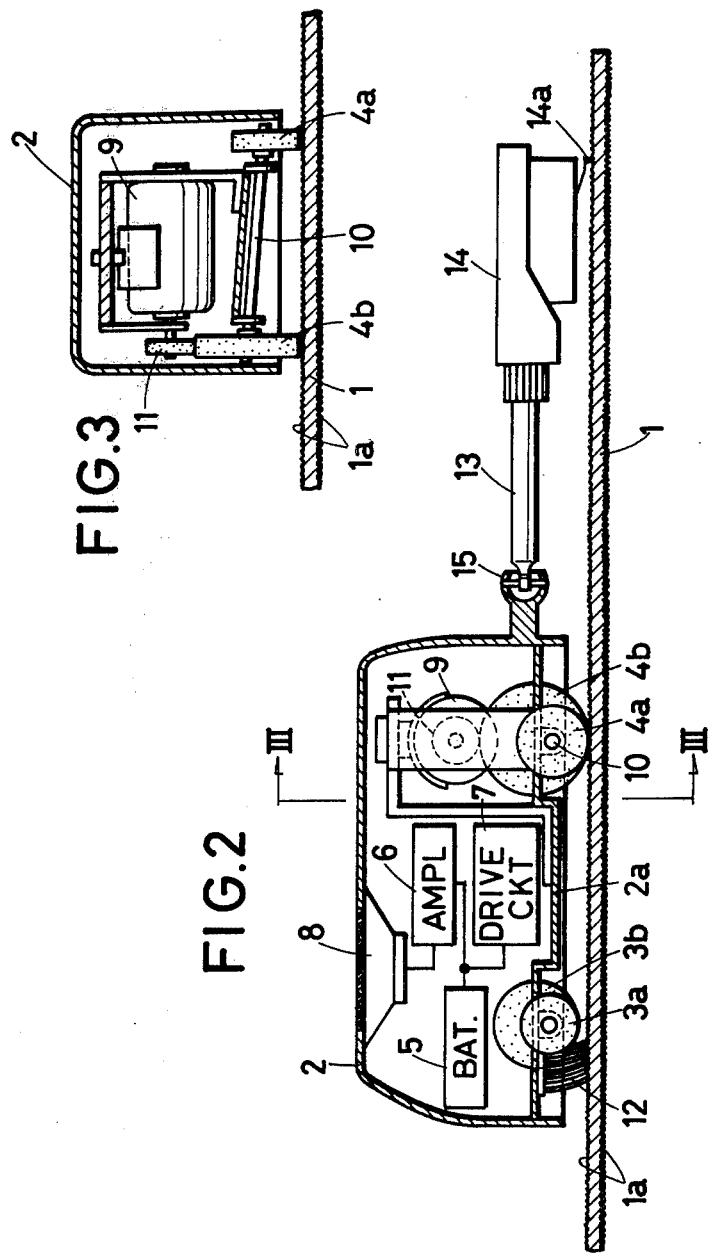

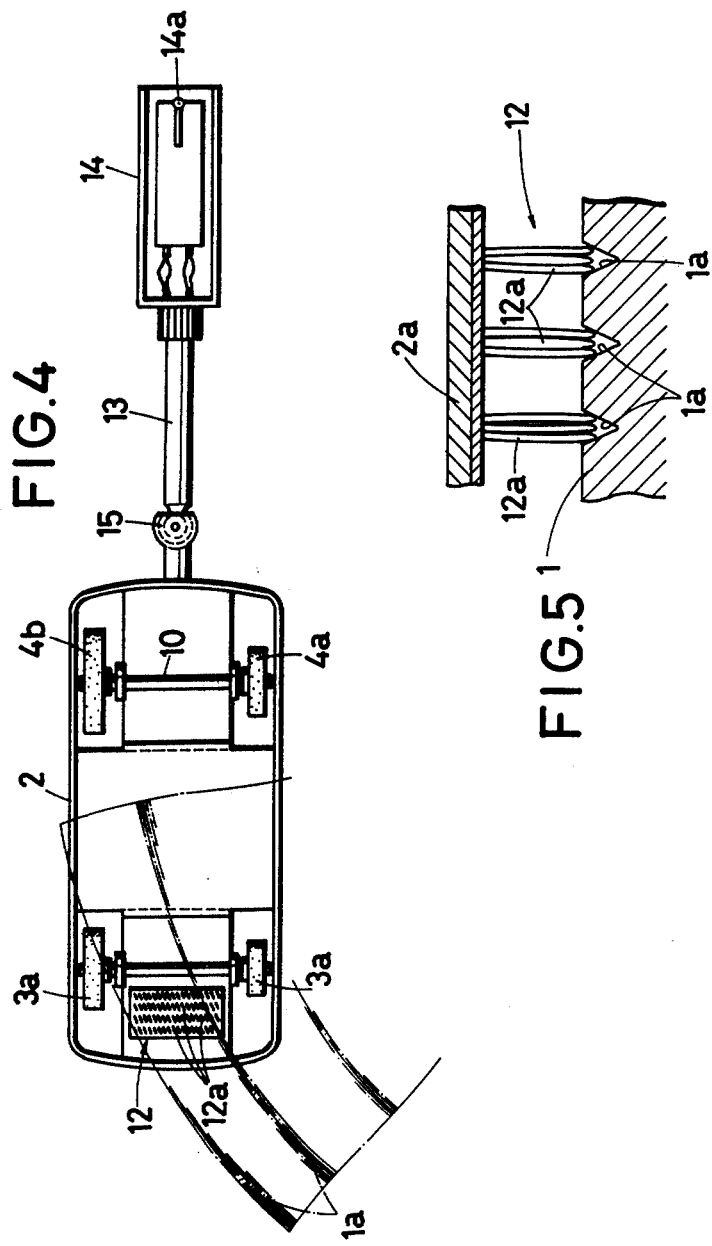

RECORD PLAYER

BACKGROUND OF THE INVENTION

1. Field of the Invention

This invention relates to a gramophone or phonograph record player, and more particularly to a toy-like record player having a movable body.

2. Description of the Prior Art

Various toys are known having therein a miniature gramophone device; such as talking dolls or animals, talking cars and musical vehicles. The incorporation of such a gramophone device into the body of a toy makes the construction of such a toy rather complex, and moreover it is difficult to provide for sound reproduction of any substantial length or variety.

A further such toy-like gramophone device is described in U.K. Pat. No. 1 145 550. This device comprises a pair of guide rails formed on a special gramophone record member, a vehicle body having wheels to be guided by the rails, a spiral sound groove formed between the guide rails on the record member, and a cartridge member connected to the vehicle body and operative to reproduce sound recorded in the sound groove on the record member.

With this device, where the gauge of the guide rails is fairly large, it may be possible to reproduce sound for a reasonably long time. However, it is required to provide the special record member with the two projecting guide rails, for each different sound to be reproduced. It is not possible to reproduce conventional disc records as now on the market, because such records lack the guide rails.

SUMMARY OF THE INVENTION

It is an object of this invention to provide a toy-like gramophone record player which can reproduce a sound recorded on a conventional record.

It is another object of this invention to provide a novel toy-like gramophone record player which comprises a movable body, which will follow a spiral sound groove on a disc record, and a pick-up cartridge to trace the sound groove.

It is another object of this invention to provide a gramophone record player which comprises a movable body having a gramophone record sound groove following guidance member to be guided by a sound groove formed on a record, a drive means for the body, and sound pick-up means mechanically connected to the movable body so as to reproduce a sound recorded on the record, wherein the guidance member is guided by the sound groove on the record so that the movable body can travel along the sound groove without special guide rails, and further wherein it is possible to reproduce sound from a conventional gramophone record.

It is a further object of this invention to provide a toy-like gramophone record player which comprises; a movable body having a motor, a pair of wheels of different diameters, and a guidance member to be guided by a sound groove formed on a gramophone record; and a sound pick-up means to reproduce sound from the record; which record player is simple in construction and can be mass produced at low cost.

It is yet another object of this invention to provide a toy gramophone record player which can reproduce sound for a substantial time.

It is another object of this invention to provide a toy gramophone record player having a movable body and a sound pick-up means, and which can cause correct reproduction of sound when the movable body is placed on a record with the sound pick-up means engaged with any point of the sound groove.

It is still another object of this invention to provide a gramophone record player which comprises a movable body having a flexible brush-like guidance member to be guided by a sound groove of a stationary gramophone record, and which can reproduce sound without scratching the record.

It is another object of this invention is to provide a toy-like record player which comprises a movable body formed like a doll, animal, vehicle or the like, to awaken children's interest in the record player and the sound reproduced.

According to the present invention there is provided a gramophone record player suitable for use with a stationary disc gramophone record having a spiral sound groove, said record player comprising a movable body to be placed on said record, drive means for driving said movable body so as to move in a generally circular path on said record, a sound pick-up means for engaging said sound groove, said pick-up means being mechanically coupled to said movable body, and a sound groove following guidance member connected to said movable body and arranged to engage and follow said sound groove thereby modifying said circular path to a spiral path such that said movable body and said sound pick-up means follow said sound groove and said pick-up means derives a sound signal from said sound groove.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 is an enlarged sectional view along line II—II of FIG. 1;

FIG. 3 is a sectional view along line III—III of FIG. 2;

FIG. 4 is a bottom plan view of the record player of FIG. 1;

FIG. 5 is an enlarged sectional view of a part of a guidance member of the record player of FIG. 1 engaged with a sound groove of the record;

DESCRIPTION OF THE PREFERRED EMBODIMENTS

Figure 1:
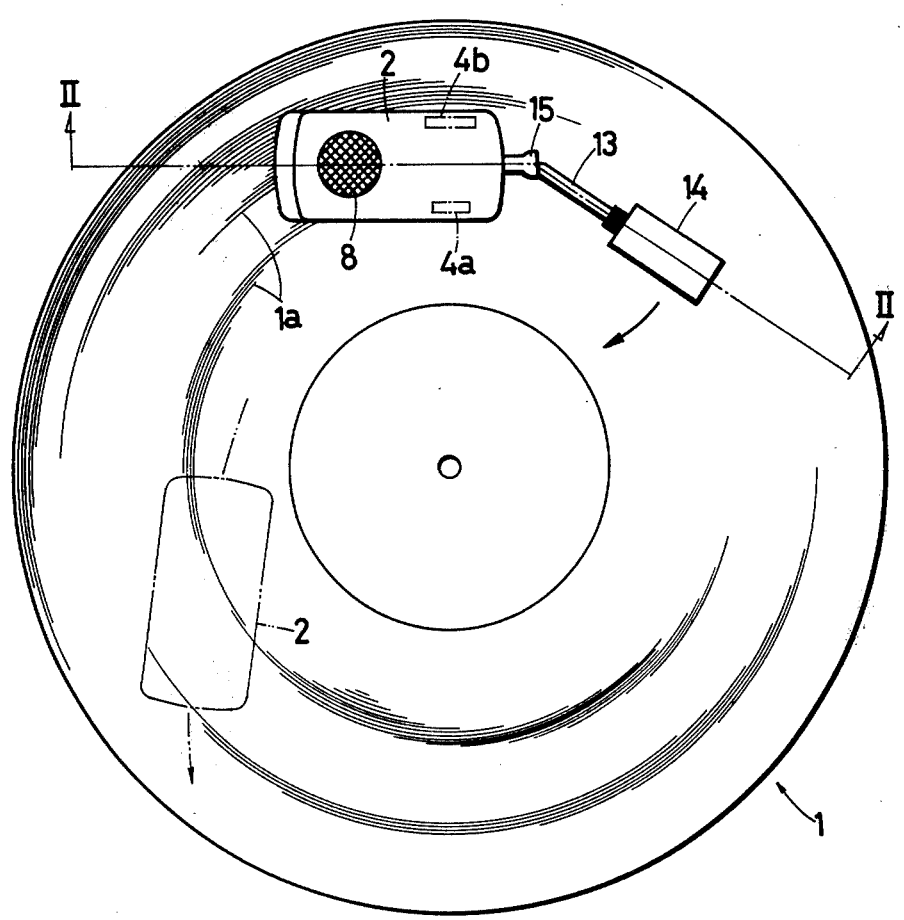
FIG. 1 is a top plan view of a first embodiment of gramophone record player according to this invention with a disc gramophone record.

In FIGS. 1 to 4, a movable body 2 which is designed and configured to look like a toy vehicle, in this case a bus, is placed on a conventional disc gramophone record 1 having a spiral sound groove 1a. The movable body 2 comprises a chassis 2a having a pair of front wheels 3a and 3b having different diameters, and a pair of rear wheels 4a and 4b having different diameters. The movable body 2 further includes a battery 5, an audio amplifier 6, a motor drive circuit 7, a loudspeaker 8 and a motor 9 to drive the wheels 4a and 4b when powered by the battery 5 through the drive circuit 7.

The rear wheels 4a and 4b have conically tapered running surfaces, and are interconnected by a shaft 10 as shown in FIGS. 3 and 4. One of wheels 4a and 4b, for example the wheel 4b is driven by the motor 9 through a drive wheel 11 as shown in FIG. 3, so that the movable body 2 is thereby driven. The diameter of the wheel 4b, which in use is placed on the radially outer side of the record 1, is greater than that of the wheel 4b which is placed on the radially inner side of the record 1, so that the movable body 2 when driven tends to follow a predetermined circular path, for example, 10 cm in radius.

A gramophone record sound groove following guidance member 12 made of a flexible material, is fixed under the chassis 2a. More particularly, the guidance member 12 is formed by a plurality of brushes 12a, as seen in FIGS. 4 and 5. Each brush 12a comprises a plurality of bristles and terminates in a substantially linear outer end surface, the lengths of all these surfaces being arranged in the direction of the sound groove 1a, when the movable body is correctly positioned on the record 1, as shown in FIG. 4. In this position therefore, the outer end portions of the brushes 12a contact with or engage in the sound groove 1a as shown in FIG. 5 when the movable body 2 is correctly positioned on the record 1. This means that when the movable body 2 is driven, the guidance member 12 is engaged with the sound groove 1a, the pressure being such that the guidance member 12 is guided by and follows the sound groove 1a. The movable body 2 therefore travels in a spiral path corresponding to the spiral sound groove 1a. This path is coarsely determined by the radii of the wheels 4a and 4b, and finely determined by the cooperation of the guidance member 12 with the sound groove 1a. The front wheels 3a and 3b float above the surface of the record 1, so that they are just decorations.

A sound pick-up means 14 forming part of a sound reproducer has a stylus 14a, such as a pick-up cartridge, and is mechanically coupled to the movable body 2 by a tube or rod 13 through a universal joint 15. The pick-up means 14 is also electrically connected to the amplifier 6 by a suitable cable (not shown).

In operation, the movable body 2 and pick-up means 14 are placed on the record 1. The movable body 2 may for example be placed at a distance of 10 cm from the central of the record 1, and then the stylus 14a is engaged with the sound groove 1a.

Thus, when the motor 9 is energised, the movable body 22 is driven in a spiral path determined in part by the different diameters of the wheels 4a and 4b, and in part by the guidance member 12. More particularly, pointed ends of the bristles of the brushes 12a engage the sound groove 1a and contact the side surfaces of the sound groove 1a as shown in FIG. 5. The front part of the movable body 2 is thus automatically guided so as to follow the sound groove 1a when the wheels 4a and 4b are driven. Any deviation from the correct course is corrected by the guidance member 12, and if there were no guidance member 12, and the movable body 2 were placed on the record 1 as indicated by dotted lines in FIG. 1, the movable body 2 would move along an arcuate path determined by the diameter of the wheels 4a and 4b, so it would not be possible to reproduce a correct sound.

The movable body 2 travels along the sound groove 1a at a predetermined speed appropriate to correct reproduction of sound therefrom. The pick-up member 14 therefore supplies a signal, derived from the sound groove 1a, to the amplifier 6, which supplies a signal to operate the loudspeaker 8. During operation, since the movable body 2 travels at a constant speed and in the predetermined spiral path, the pick-up member 14 with stylus 14a picks up the sound as it traces the sound groove 1a and is shifted towards the centre of the record 1.

Figure 6:
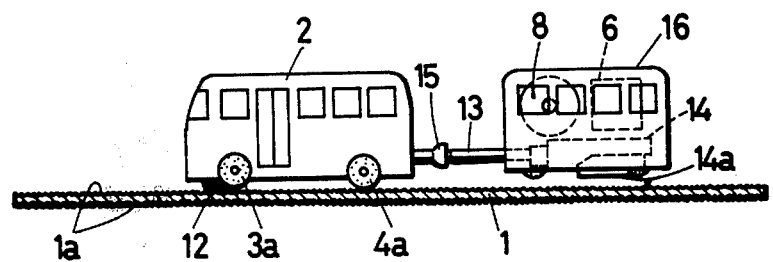
FIG. 6 is a side plan view of a second embodiment of this invention with a disc gramophone record.

A second embodiment of the invention is shown in FIG. 6. In this case the pick-up means 14 having the stylus 14a is provided within a car body 16. The car body 16 also houses the amplifier 6 for amplifying a sound signal picked up by the pick-up means 14 and the loudspeaker 8, which is located by a window of the car body 16.

Figure 7:
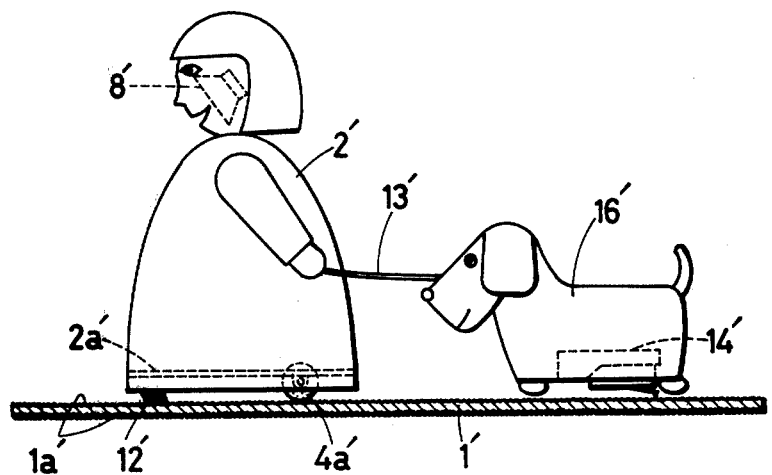
FIG. 7 is a side plan view of a third embodiment of this invention with a disc gramophone record.

A third embodiment of the invention is shown in FIG. 7. In this case a movable body 2' is designed and configured as a doll instead of a vehicle, and a loudspeaker 8' is located near the doll's mouth. A pick-up means 14' is enclosed in a body 16' designed and configured as an animal, such as a dog. The dog's body 16' is mechanically and electrically connected to the doll's body 2' through a connecting rod 13'. A universal joint may be provided at the head portion of the dog's body 16' or the hand portion of the doll's body 2'. With this arrangement, if animal sounds, or chattering of the doll, or songs are recorded on a record 1', such sounds are reproduced by the loudspeaker 8'.

As a modification, the pick-up means may be detachably connected to a movable body, or may be loosely mounted on a movable body, and moreover provision may be made for the motor to be energised automatically when the guidance member is engaged with a gramophone record.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A phonograph record player suitable for use with a stationary disc phonograph record having a spiral sound groove, said record player comprising a movable body to be placed on said record, drive means for driving said movable body to move in a generally circular path on said record, sound reproducing means associated with said movable body for engaging said sound groove and reproducing a sound signal recorded therein, and a sound groove guidance member connected to said movable body and arranged to engage said sound groove for guiding said movable body in the direction of said sound groove.

2. A phonograph record player according to claim 1 wherein said guidance member is made of flexible material, and a portion of said guidance member enters said sound groove when said record player is placed on said record.

3. A phonograph record player according to claim 1 wherein said guidance member comprises a brush having an outer end which enters said sound groove when said record player is placed on said record.

4. A phonograph record player according to claim 1 wherein said guidance member comprises a plurality of brushes made of flexible bristles, each said brush having a substantially linear outer end surface, the lengths of said surfaces being parallel to one another and, when said record player is placed on said record, parallel to the general plane of said record and to the general direction of said sound groove, so as to enter said sound groove.

5. A phonograph record player according to claim 1 wherein said drive means comprises a motor enclosed within said movable body, and a pair of generally adjacent wheels adapted to be driven by said motor and having different diameters for determining said generally circular path.

6. A phonograph record player according to claim 5 wherein said reproducing means includes a pick-up means for reading said sound signal in said sound groove, an amplifier for amplifying said sound signal and a loudspeaker for developing a sound in dependence on the signal supplied by said amplifier.

7. A phonograph record player according to claim 6 wherein said pick-up means is coupled to said movable body by a connecting means including an elongated member and a universal joint.

8. A phonograph record player according to claim 1 wherein said drive means comprises a motor and a pair of wheels to be driven by said motor, and said record player further comprises a second movable body enclosing said pick-up means, an amplifier for amplifying said sound signal, and a loudspeaker for developing a sound in dependence on the signal supplied by said amplifier, said second movable body being coupled to said first-mentioned movable body by a coupling means including a universal joint.

* * * * *